United States Patent
Adams et al.

(10) Patent No.: US 10,651,566 B2
(45) Date of Patent: May 12, 2020

(54) UNIT CELL ANTENNA FOR PHASED ARRAYS

(71) Applicant: The Boeing Company, Chicago, IL (US)

(72) Inventors: Alec Adams, Seattle, WA (US); Lixin Cai, Ravensdale, WA (US)

(73) Assignee: The Boeing Company, Chicago, IL (US)

( * ) Notice: Subject to any disclaimer, the term of this patent is extended or adjusted under 35 U.S.C. 154(b) by 9 days.

(21) Appl. No.: 15/959,995

(22) Filed: Apr. 23, 2018

(65) Prior Publication Data

US 2019/0326685 A1    Oct. 24, 2019

(51) Int. Cl.
  *H01Q 21/28*    (2006.01)
  *H01Q 21/06*    (2006.01)
  *G01S 13/02*    (2006.01)
  *H01Q 1/28*     (2006.01)
  *H01Q 21/22*    (2006.01)

(52) U.S. Cl.
  CPC .......... *H01Q 21/062* (2013.01); *G01S 13/02* (2013.01); *H01Q 1/288* (2013.01); *H01Q 21/22* (2013.01); *G01S 2013/0254* (2013.01)

(58) Field of Classification Search
  CPC ...... H01Q 21/062; H01Q 21/22; H01Q 1/288; G01S 13/02; G01S 2013/0254
  See application file for complete search history.

(56) References Cited

U.S. PATENT DOCUMENTS

| | | | |
|---|---|---|---|
| 4,126,866 A * | 11/1978 | Pelton | H01Q 1/425 343/872 |
| 6,198,460 B1 * | 3/2001 | Brankovic | H01Q 1/1242 343/700 MS |
| 6,512,487 B1 | 1/2003 | Taylor et al. | |
| 7,965,252 B2 | 6/2011 | Shtrom et al. | |
| 8,743,015 B1 * | 6/2014 | West | H01Q 1/12 343/853 |
| 9,099,777 B1 * | 8/2015 | Manry, Jr. | H01Q 1/288 |
| 9,368,879 B1 * | 6/2016 | Manry, Jr. | H01Q 21/26 |
| 2005/0110699 A1 * | 5/2005 | Timofeev | H01Q 1/245 343/797 |
| 2006/0044189 A1 * | 3/2006 | Livingston | H01Q 19/005 343/700 MS |

(Continued)

OTHER PUBLICATIONS

Ben Munk et al; A Low-Profile Broadband Phased Array Antenna; The Ohio State University Dept of Electrical Engineering; 2003.
E. G. Magill et al; Wide-Angle Impedance Matching of a Planar Array Antenna by a Dielectric Sheet; IEEE Transaction on Antennas and Propagation; vol. AP-14, No. 1; Jan. 1966.

(Continued)

*Primary Examiner* — Dieu Hien T Duong
*Assistant Examiner* — Bamidele A Jegede
(74) *Attorney, Agent, or Firm* — Duft & Bornsen, PC

(57) ABSTRACT

Unit cells for phased array antennas are described. The unit cells include a plurality of dipole antennas that are used to form a phased array antenna. In particular, the unit cells that form the phased array antenna each include a plurality of dipole antennas formed on a surface of a substrate that are arranged to collectively form a triangle. A plurality of the unit cells may be linked together to form a triangular lattice array having almost any desired size and aperture, thereby allowing the RF engineer the freedom to achieve a wide variety of performance goals when designing a phased array antenna.

17 Claims, 12 Drawing Sheets

(56) References Cited

U.S. PATENT DOCUMENTS

| | | | |
|---|---|---|---|
| 2008/0191955 A1 | 8/2008 | Manholm et al. | |
| 2008/0246680 A1* | 10/2008 | Rawnick | H01Q 9/285 343/795 |
| 2010/0073254 A1* | 3/2010 | Lee | H01Q 5/364 343/860 |
| 2013/0069840 A1* | 3/2013 | Lewis | H01Q 9/0407 343/798 |
| 2013/0222200 A1* | 8/2013 | Ju | H01Q 15/02 343/833 |
| 2013/0285867 A1* | 10/2013 | Wang | H01Q 1/246 343/770 |
| 2014/0009347 A1* | 1/2014 | Bertin | H01Q 1/2258 343/725 |
| 2015/0364831 A1* | 12/2015 | Li | H01Q 21/08 343/816 |
| 2016/0062205 A1* | 3/2016 | Bernhardt | G02F 1/167 359/296 |
| 2016/0156109 A1* | 6/2016 | Anderson | H01Q 21/0093 343/852 |
| 2016/0190683 A1* | 6/2016 | Brown | H01Q 1/523 343/865 |
| 2016/0315394 A1* | 10/2016 | Roy | H01Q 15/24 |
| 2016/0365638 A1* | 12/2016 | Luk | H01Q 9/065 |
| 2017/0025749 A1* | 1/2017 | Frye | H01Q 1/38 |

OTHER PUBLICATIONS

Harold A. Wheeler; Simple Relations Derived from a Phased-Array Antenna Made of an Infinite Current Sheet.

Henry H. Vo et al; A Very Low-Profile UWB Phased Array Antenna Design for Supporting Wide Angle Beam Steering; IEEE 2016.

Jonathan P. Doane et al.; A 6.3:1 Bandwidth Scanning Tightly Coupled Dipole Array with Co-Designed Compact Balun; The Ohio State Univery, Columbus, OH.

Mark Jones et al; A New Approach to Broadband Array Design Using Tightly Coupled Elements; Harris Corporation; Melbourne, FL; 2007.

Markus H. Novak et al; Ultra-wideband phased array for small satellite communications; IET Microwaves, Antennas & Propagation; IET Journals; 2017.

Steven S. Holland et al; The Planar Ultrawideband Modular Antenna (PUMA) IEEE Transactions on Antennas and Propagation, vol. 60, No. 1; Jan. 2012.

B.A. Munk, Finite Antenna Arrays and FSS. John Wiley & Sons, New York, 2003.

Antonia-Daniele Capobianco et al; a Compact MIMO Array of Planar End-Fire Antennas for WLAN Applications; Sep. 1, 2011.

European Search Report; Application EP19170534; dated Aug. 1, 2019.

* cited by examiner

UNIT CELL ANTENNA FOR PHASED ARRAYS

FIELD

This disclosure relates to the field of phased arrays, and in particular, to phased array antennas that are formed from an array of unit cell antennas.

BACKGROUND

Phased arrays are electromagnetic antenna systems that include a large number of antenna elements along with electronics connected to the antenna elements that perform beam forming. The antenna elements are typically positioned in an orderly grid within the antenna aperture.

When the phased array is in a receive mode, each of the antenna elements capture some portion of the Radio Frequency (RF) energy from incoming signals and convert the RF energy into separate electrical signals that are fed to the electronics. The electronics utilize reconfigurable gain and phase delays for the separate electrical signals in order to generate a spatial filter that strongly favors signals arriving from a specific direction. This favored direction represents the look angle of its beam, with the shape of the beam adjustable based on weighting factors applied to the separate electrical signals.

When the phased array is in a transmit mode, electrical signals generated by the electronics are fed to the antenna elements, which convert the electrical signals into radiant energy. The control electronics vary the phase relationship between the antenna elements such that radio waves from the separate antenna elements add together to increase radiation in a desired direction, while cancelling to suppress radiation in undesired directions.

One current solution utilizes relatively bulky and narrowband waveguides having a circular cross-section to form the aperture of the phased array antenna. However, this and other existing solutions cannot meet ultra-wide bandwidth while scanning and other requirements for some applications that are currently being developed.

It is therefore evident that phased array antennas may be improved in order to support ultra-wideband applications that are in use today.

SUMMARY

Unit cells for phased array antennas are described. The unit cells include a plurality of dipole antennas that are used to form an array for a phased array antenna. In particular, the unit cells that form the phased array antenna each include a plurality of dipole antennas formed on a surface of a substrate that are arranged to collectively form a triangle. A plurality of the unit cells may be linked together to form a triangular lattice array having almost any desired size and antenna aperture, thereby allowing the RF engineer the freedom to achieve a wide variety of performance goals when designing a phased array antenna.

One embodiment comprises a phased array antenna that includes at least one unit cell. The at least one unit cell includes a substrate having a first surface and a plurality of dipole antennas arranged on the first surface to collectively form a triangle.

Another embodiment comprises a method of fabricating a unit cell for a phased array antenna. The method comprises obtaining a substrate having a first surface and a second surface that opposes the first surface. The method further comprises forming a plurality of dipole antennas on the first surface that are arranged to collectively form a triangle.

Another embodiment comprises a phased array antenna. The phased array antenna includes a plurality of unit cells arranged to form a Tightly Coupled Dipole Array (TCDA) having a triangular lattice. Each of the unit cells comprise a substrate having a first surface, and a plurality of dipole antennas arranged on the first surface to collectively form a triangle.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, with reference to the accompanying drawings. The same reference number represents the same element or the same type of element on all drawings.

DETAILED DESCRIPTION

Figure 1:
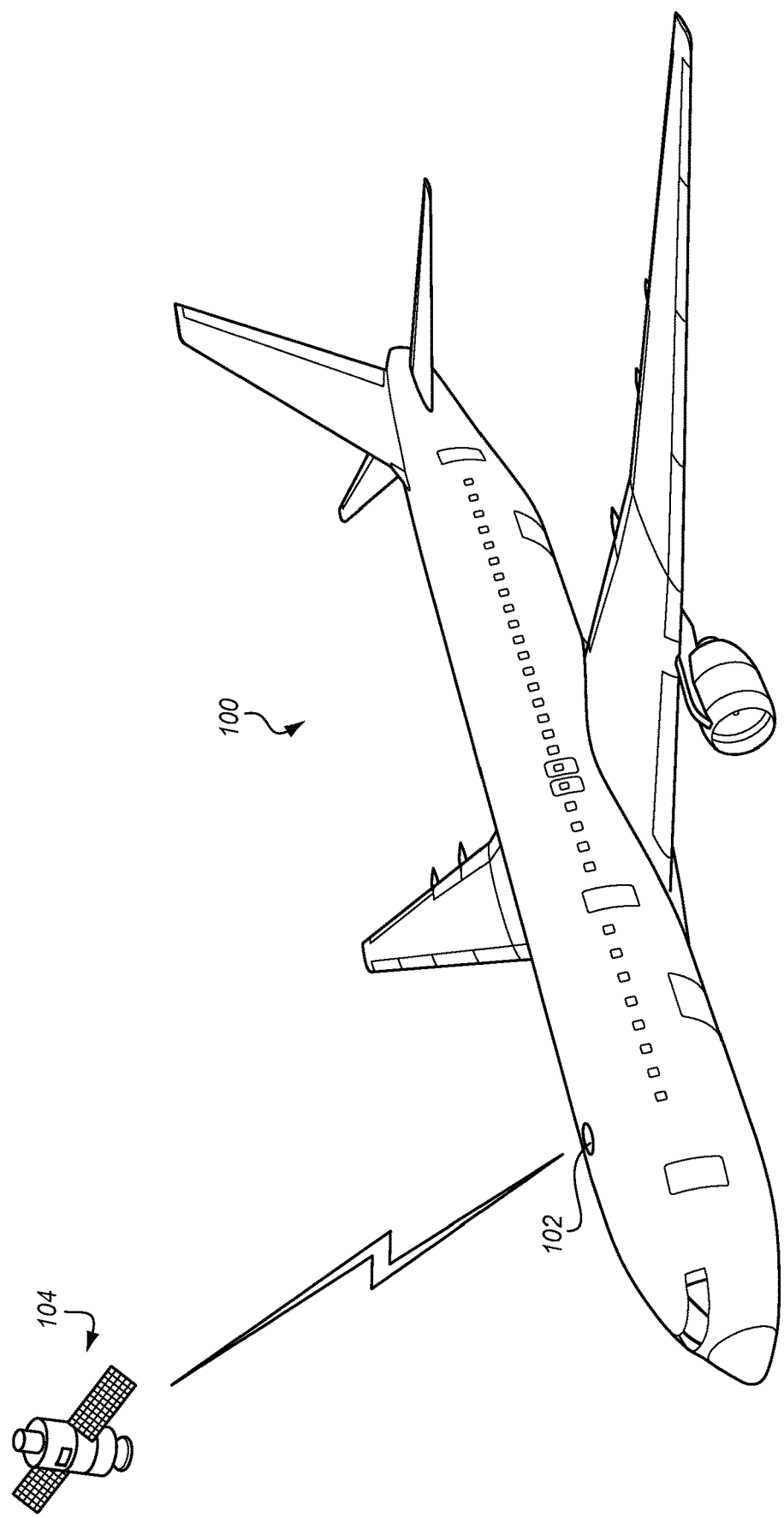
FIG. 1 illustrates an airborne mobile platform having a phased array antenna in an illustrative embodiment.

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Phased arrays have gained acceptance over traditional mechanical scanning antennas because they allow for rapid beam steering electronically, rather than mechanically. The term "phased array" and "Electronically Scanned Array" (ESA) are often used interchangeably. Older generation phased arrays were implemented as a Passive Electronically Scanned Array (PESA). In PESAs, the antenna elements in the phased array are connected to a single transmitter and/or receiver through adjustable phase shifters.

Modern advances in electronics have led to the development of Active Electronically Scanned Arrays (AESAs) that utilize solid state transmit/receive modules (TRMs) that are communicatively coupled to each antenna element of the phased array. Compared to PESAs that use phase shifters connected to a single source, the use of TRMs allow for the control of phase, gain, and frequency at an individual radiating element in the phased array. AESAs are considered a more sophisticated version of a PESA. While a PESA can only emit a single beam of radio waves at a single frequency at a time, AESAs can radiate multiple beams of radio waves at multiple frequencies simultaneously. Most modern aircraft implement Radio Detection and Ranging (RADAR) system using AESA.

While RADAR is one use of phased arrays, other uses may include wireless communication and Electronic Warfare (EW). Phased arrays are useful in providing bi-directional communication capabilities to mobile platforms due to the ability to perform beamforming without mechanically moving the antenna. For example, an aircraft in flight may utilize a phased array antenna to communicate with one or more satellites by electronically steering the phased array antenna to track a satellite rather than mechanically moving an antenna. While the aircraft is in flight, the pitch, yaw, and roll of the aircraft can be compensated for electronically using electronic steering of the phased array rather than mechanical steering of a traditional antenna. This improves the reliability of the data connection. In EW applications, the phased array can operate as a jammer using beamforming directed at a target. Ultra-wideband provides additional capabilities in engaging frequency-diverse targets. In receive-only mode such as Signal Intelligence (SigInt), ultra-wideband covers signals of interest over a wider frequency spectrum.

Phased arrays have increasingly been implemented using PCB fabrication techniques to provide flexibility in the design of the phased array and the integration of Radio Frequency (RF) circuits. In some cases, unit cells for the phased array are formed from PCBs that include antenna elements. These unit cells may be combined as desired to form an array of PCBs, thereby allowing for flexibility in the geometry of the phased array. However, existing unit cells for phased arrays in ultra-wideband (UWB) applications utilize a rectangular lattice, which lacks flexibility in implementing various geometries of phased arrays. Phased arrays that utilize UWB capable cells are desired, as they enable the phased array antenna to operate over a wider frequency band. For instance, UWB phased arrays may be useful in high-bandwidth communications, UWB RADAR implementation, and UWB EW implementations.

In the embodiments described herein, unit cells are described that utilize a triangular dipole configuration that when combined to form a phased array antenna, implement a triangular lattice. The use of a triangular lattice in UWB phased arrays allows for about a fifteen percent larger unit cell size over rectangular arrays without compromising the grating-lobe free maximum can limit. Further, the triangular lattice phased array antenna is more suitable for electronics integration at millimeter wavelengths due to the larger unit cell size. Further, the use of a triangular lattice phased array antenna also provides more flexibility to form non-rectangular antenna apertures, which may be used to improve RF performance, including the ability to achieve sidelobe level targets, the ability to reduce cross-polarization, and the ability to improve other parameters over scan volume and/or observation field-of-view. Other solutions such as connected arrays or Tightly Coupled Arrays (TCA) can meet ultra-wide bandwidth while scanning but in general rely on a rectangular or square array lattice rather than the more desirable triangular lattice. The present disclosure combines ultra-wide bandwidth while scanning and a triangular lattice. The advantages of a triangular lattice include larger allowable unit cell size and thus reduced RF packaging, improved cross-polarization or axial ratio performance at scan.

FIG. 1 illustrates a mobile platform 100 having a phased array antenna 102 in an illustrative embodiment. In this embodiment, mobile platform 100 is an aircraft having a particular configuration, although in other embodiments mobile platform 100 may include other aircraft, both manned and unmanned, having different configurations as desired. Mobile platform 100 may include drones, missiles, vehicles, stationary communication installations, hand-held communication equipment, etc., as desired. Thus, the particular illustration with respect to mobile platform 100 in FIG. 1 is merely for purposes of discussion.

In this embodiment, mobile platform 100 communicates with one or more satellite(s) 104 using phased array antenna 102, although in other embodiments phased array antenna 102 may be used to communicate with other entities that utilize Common Data Link (CDL) protocols. In this embodiment, phased array antenna 102 provides a bi-directional communication link between mobile platform 100 and satellite(s) 104. For example, phased array antenna 102 may communicate with satellite(s) 104 to provide high speed bi-directional data services to mobile platform 100 over the Ka-band, which covers frequencies from 26.5 GHz to 40 GHz. One example of a Ka-band data service that may be provided by satellite(s) 104 includes the Inmarsat Global Xpress (GX) program. In other embodiments, phased array antenna 102 may be utilized to implement RADAR (e.g., UWB RADAR) or EW (e.g., UWB EW). In the embodiments described herein, phased array antenna 102 is formed from a plurality of unit cells, which form an elemental antenna unit for phased array antenna 102. In particular, the unit cells include a plurality of dipole antennas arranged on a surface of a substrate to form an equilateral triangle. Generally, the unit cells described herein are RF building blocks for phased array antennas. For instance, if the unit cells are implemented on a PCB, then individual PCBs forming the unit cells may be arranged in an array to form a phased array antenna.

Figure 2:
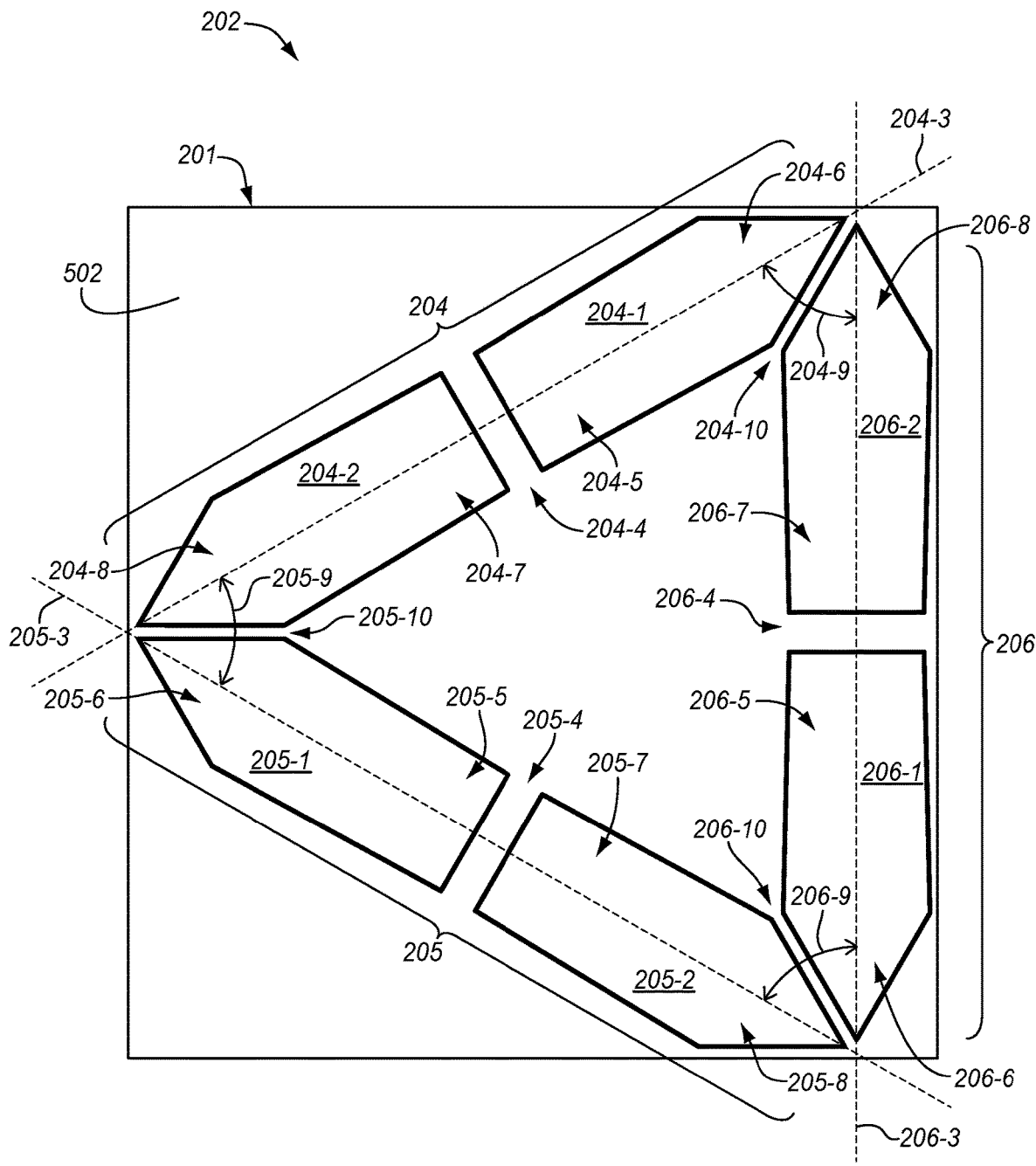
FIG. 2 illustrates a unit cell for a phased array antenna in an illustrative embodiment.

FIG. 2 illustrates a unit cell 202 for a phased array antenna (e.g., phased array antenna 102) in an illustrative embodiment. In this embodiment, unit cell 202 includes dipole antennas 204-206 formed onto a substrate 502, which collectively form a triangle. Dipole antenna 204 includes antenna element 204-1 and antenna element 204-2, which are disposed along a line 204-3 and are separated by a gap 204-4. Antenna element 204-1 includes a portion 204-5 proximate to gap 204-4, and a portion 204-6 distal from gap 204-4. Portion 204-6 is proximate to a perimeter 201 of substrate 502 and is tapered. Antenna element 204-2 includes a portion 204-7 proximate to gap 204-4, and a portion 204-8 distal from gap 204-4. Portion 204-8 is proximate to perimeter 201 of substrate and is tapered.

Dipole antenna 205 includes antenna element 205-1 and antenna element 205-2, which are disposed along a line 205-3 and are separated by a gap 205-4. Antenna element 205-1 includes a portion 205-5 proximate to gap 205-4, and a portion 205-6 distal from gap 205-4. Portion 205-6 is proximate to perimeter 201 of substrate 502 and is tapered. Antenna element 205-2 includes a portion 205-7 proximate to gap 205-4, and a portion 205-8 distal from gap 205-4. Portion 205-8 is proximate to perimeter 201 of substrate and is tapered. Line 204-3 and line 205-3 intersect at an angle 205-9 of sixty degrees. Portion 204-8 and portion 205-6 are separated by a gap 205-10.

Dipole antenna 206 includes antenna element 206-1 and antenna element 206-2, which are disposed along a line 206-3 and are separated by a gap 206-4. Antenna element 206-1 includes a portion 206-5 proximate to gap 206-4, and a portion 206-6 distal from gap 206-4. Portion 206-6 is proximate to perimeter 201 of substrate 502 and is tapered. Antenna element 206-2 includes a portion 206-7 proximate to gap 206-4, and a portion 206-8 distal from gap 206-4. Portion 206-8 is proximate to perimeter 201 of substrate and is tapered. Line 206-3 and line 205-3 intersect at an angle 206-9 of sixty degrees. Portion 205-8 and portion 206-6 are separated by a gap 206-10. Line 206-3 and line 204-3 intersect at an angle 204-9 of sixty degrees. In addition, portion 204-6 and portion 206-8 are separated by gap 204-10.

Figure 3:
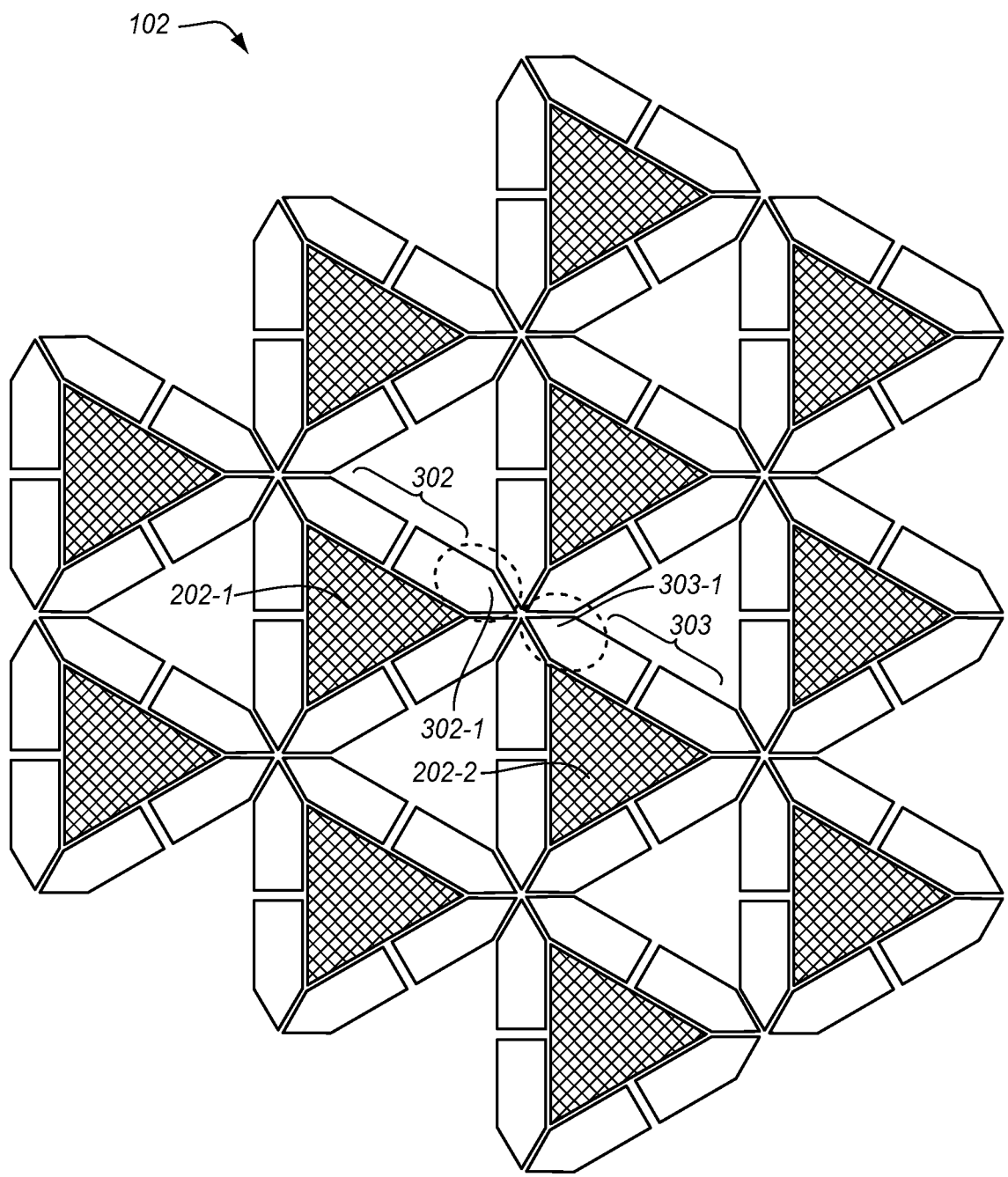
FIG. 3 illustrates a plurality of unit cells forming a phased array antenna in an illustrative embodiment.

FIG. 3 illustrates a plurality of unit cells 202 forming phased array antenna 102 in an illustrative embodiment. FIG. 3 illustrates one possible configuration of phased array antenna 102, which is a non-rectangular array of unit cells 202. However, due to the flexibility of combining unit cell 202 into a plurality of different array configurations for phased array antenna 102, one of ordinary skill in the art will recognize that different array configurations may be implemented as desired. When unit cells 202 are organized in an array as illustrated in FIG. 3, unit cells 202 form a Tightly Coupled Dipole Array (TCDA). For example, unit cell 202-1 and unit cell 202-2 are proximate to each other. Unit cell 202-1 includes a dipole antenna 302 and unit cell 202-2 includes a dipole antenna 303. Dipole antenna 302 is end-coupled to dipole antenna 303. In particular, antenna element 302-1 of dipole antenna 302 is electromagnetically coupled to antenna element 303-1 of dipole antenna 303. This process repeats for similar antenna element pairs.

Figure 4:
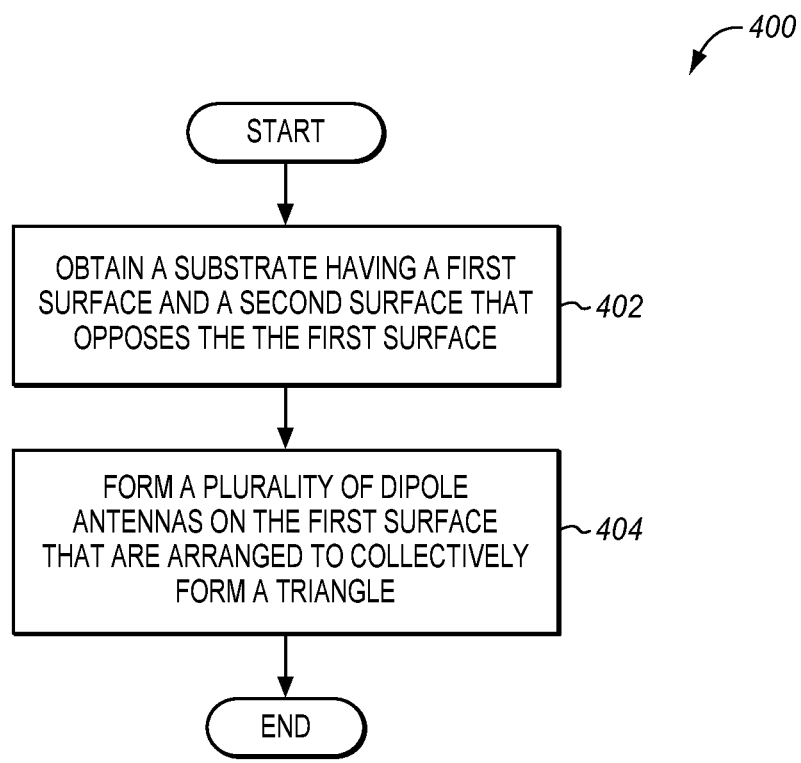
FIG. 4 illustrates a method of fabricating a unit cell for a phased array antenna in an illustrative embodiment.

FIG. 4 illustrates a method 400 of fabricating a unit cell for a phased array antenna in an illustrative embodiment. Method 400 will be described with respect to unit cell 202 illustrated in FIG. 2, although method 400 may apply to other configurations for unit cell 202 in alternate embodiments. The steps of the methods described herein may include other steps, not shown. The steps may also be performed in a different order and/or combined in alternate embodiments.

Figure 5:
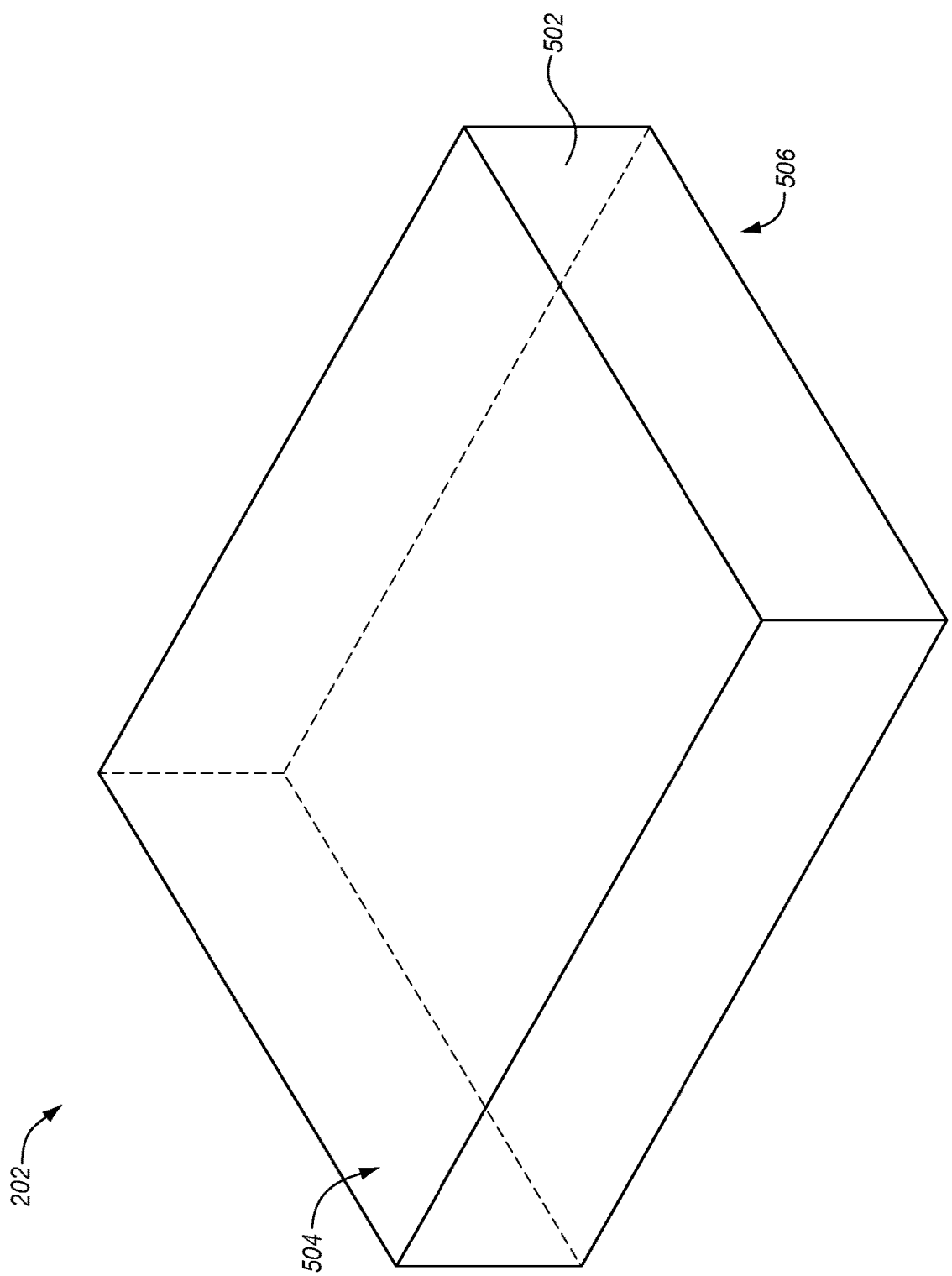
FIGS. 5-6 illustrate the result of performing steps of the method of FIG. 4 in an illustrative embodiment.
Figure 6:
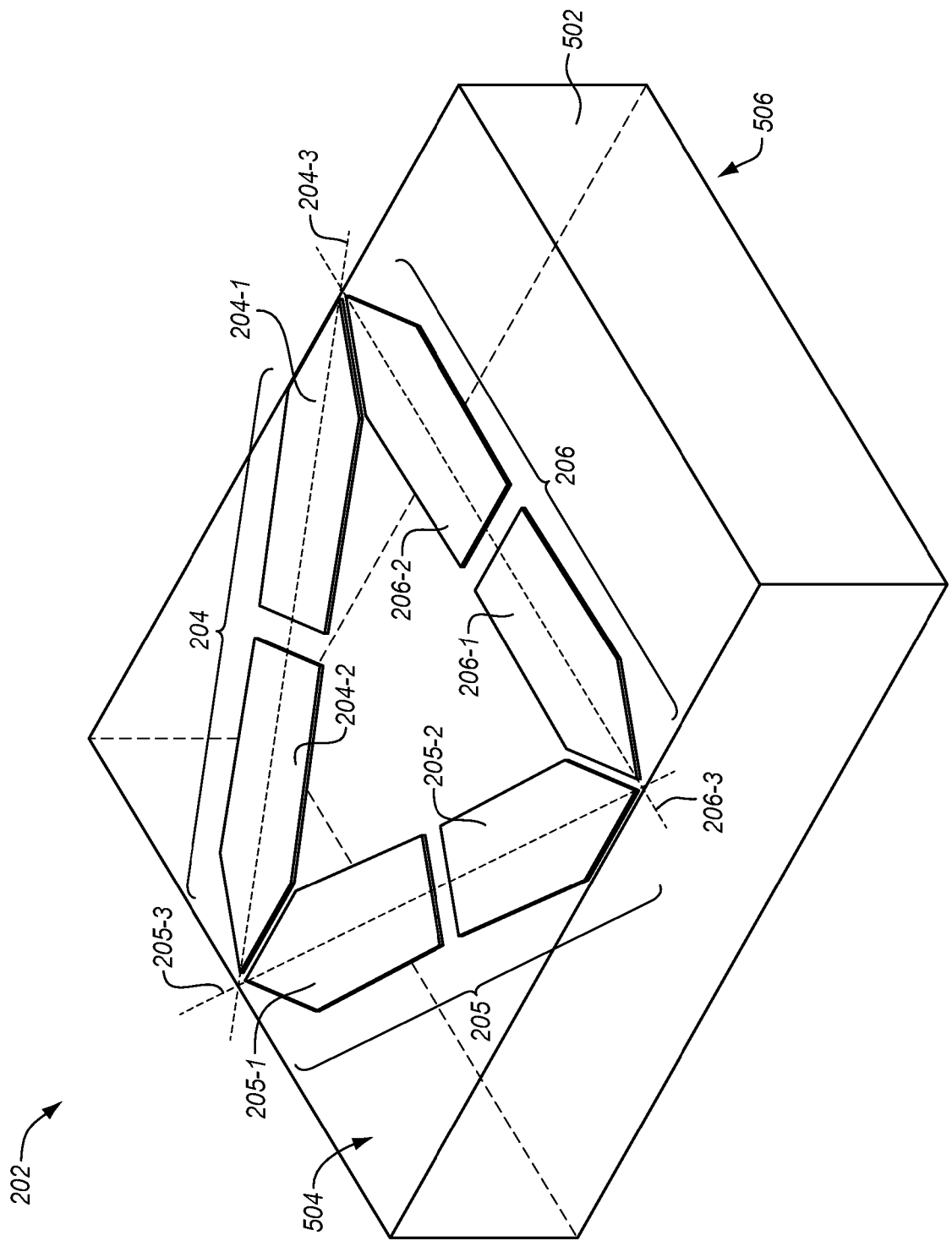

Step 402 of method 400 comprises obtaining a substrate having a first surface and a second surface that opposes the first surface (e.g., obtaining a dielectric substrate). For example, the substrate may comprise a Printed Circuit Board (PCB) that includes a metal film on the first surface that is etched for form dipole antennas 204-206. However, the substrate may include other materials as desired. FIG. 5 illustrates a substrate 502 that includes a first surface 504 and a second surface 506 that opposes first surface 504 in an illustrative embodiment. Step 404 of method 400 comprises forming a plurality of dipole antennas on first surface 504 that are arranged to collectively form a triangle. FIG. 6 illustrates substrate 502 that includes dipole antennas 204-206 formed on first surface 504 in an illustrative embodiment. Fabricating dipole antennas 204-206 may comprise a deposition process, an etch process, etc., used to form or fabricate dipole antennas 204-206 onto first surface 504 of substrate 502. For instance, if substrate 502 comprises a PCB, then fabricating dipole antennas 204-206 may comprise etching a metal film applied to first surface 504 of substrate 502.

Figure 7:
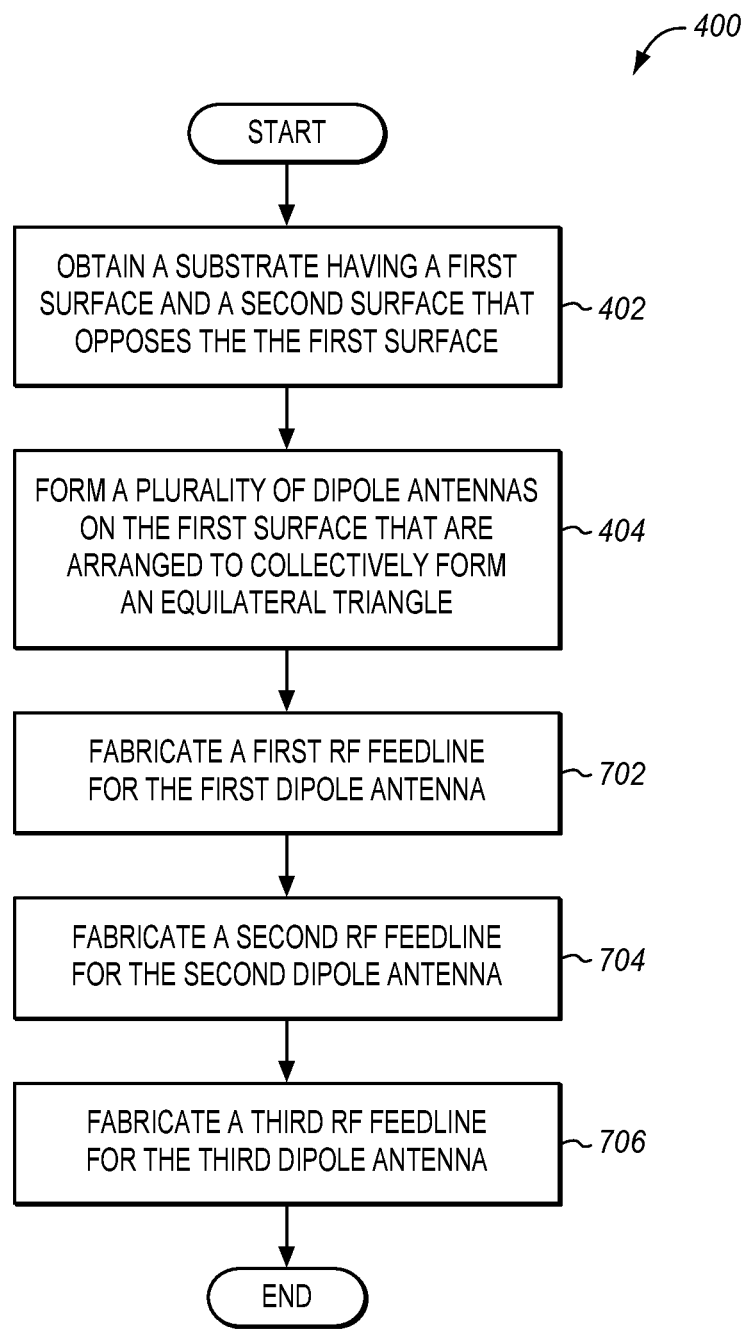
FIG. 7 illustrates additional steps of the method of FIG. 4 in an illustrative embodiment.
Figure 8:
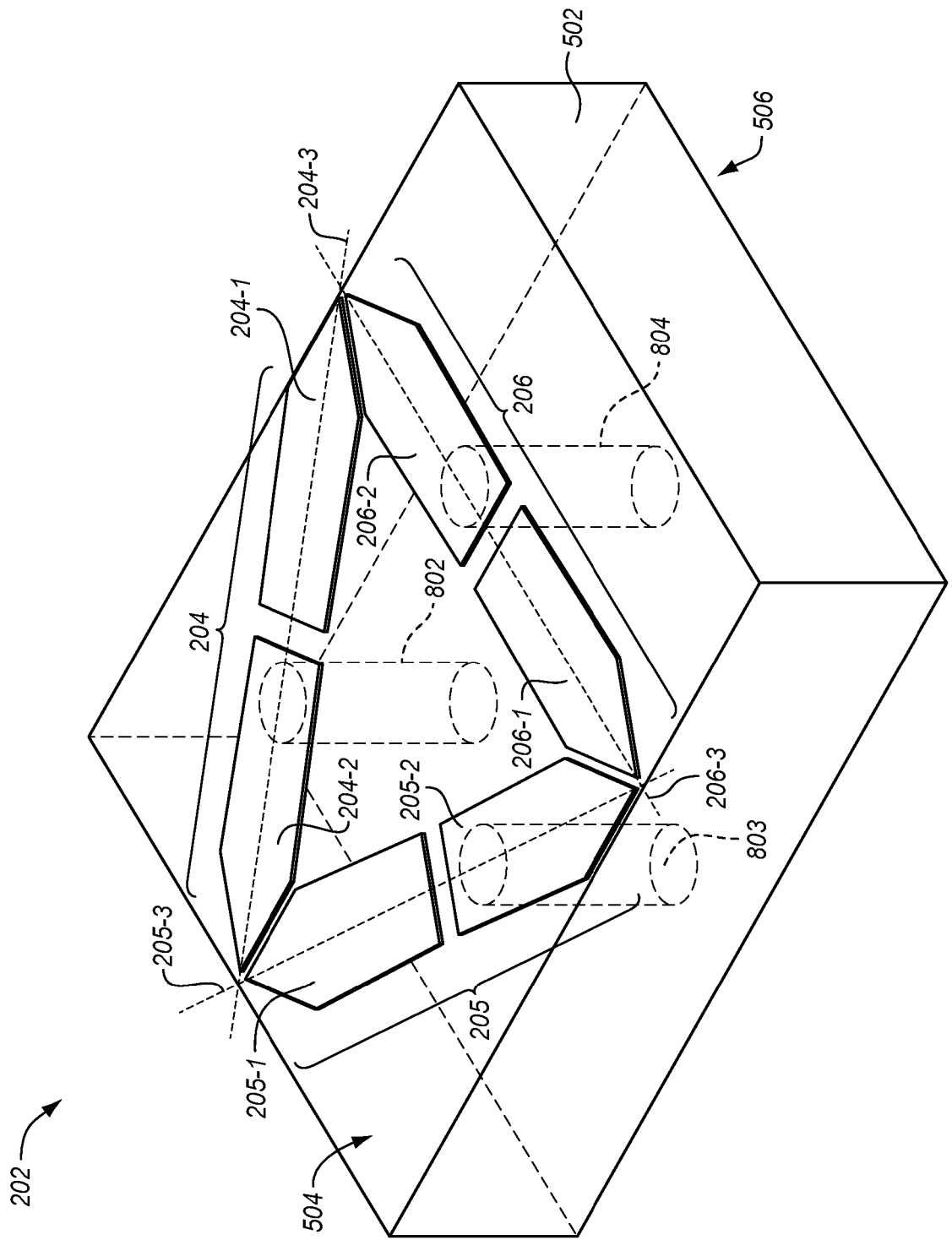
FIG. 8 illustrates the result of performing the additional steps described in FIG. 7 in an illustrative embodiment.

FIG. 7 illustrates additional steps of method 400 in an illustrative embodiment. In steps 702-706, RF feedlines fabricated for unit cell 202 that electrically couple to dipole antennas 204-207. The RF feedlines may be used to provide electrical signals to dipole antennas 204-207, thereby causing them to operate in a transmit mode. The RF feedlines may also be used to receive electrical signals from dipole antennas 204-207, thereby causing them to operate in a receive mode. FIG. 8 illustrates the result of performing steps 702-706 of method 400 in an illustrative embodiment. In particular, an RF feedline 802 is electrically coupled to dipole antenna 204 (e.g., RF feedline 802 is electrically coupled to antenna element 204-2), an RF feedline 803 is electrically coupled to dipole antenna 205 (e.g., RF feedline 803 is electrically coupled to antenna element 205-2), and an RF feedline 804 is electrically coupled to dipole antenna 205 (e.g., RF feedline 804 is electrically coupled to antenna element 206-2). Fabricating RF feedlines 802-804 may be performed in a number of different ways. For example, RF feedlines 802-804 may fabricated using vias that traverse through substrate 502 between first surface 504 and second surface 506. However, other fabrication options exist for fabricating RF feedlines 802-804, including the use of RF striplines that electrically connect to each of dipole antennas 204-207.

Figure 9:
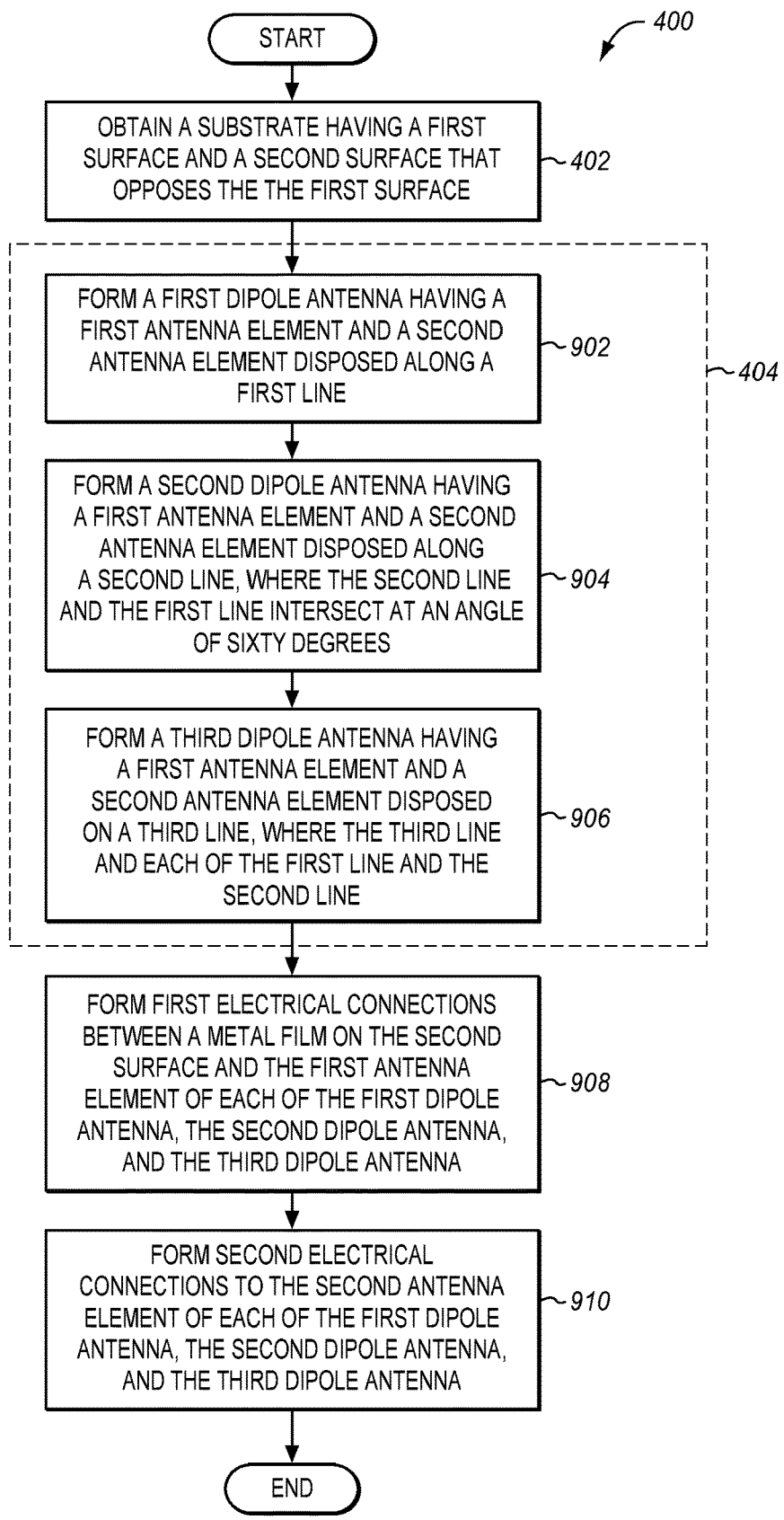
FIG. 9 illustrates additional steps of the method of FIG. 4 in an illustrative embodiment.
Figure 10:
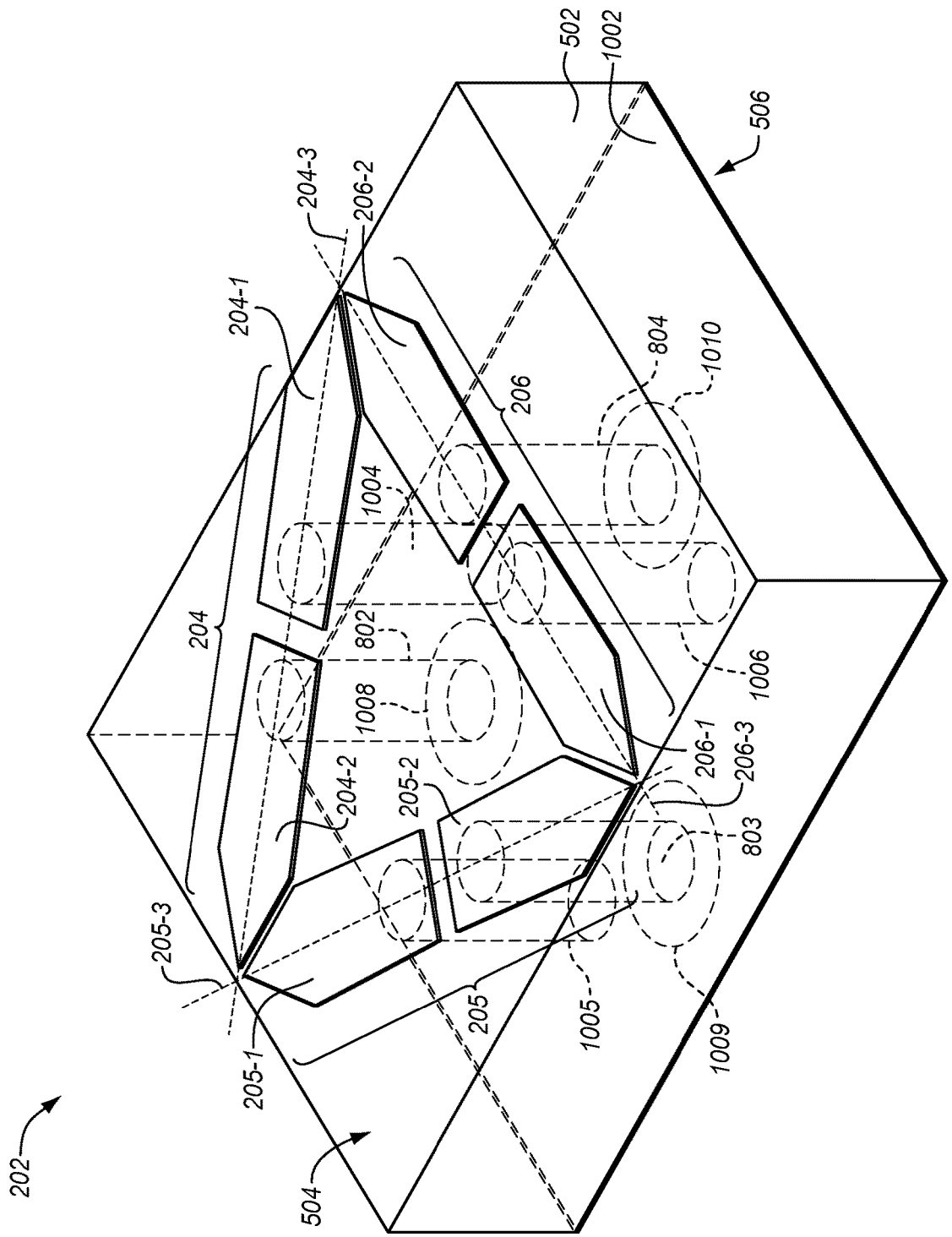
FIG. 10 illustrates the result of performing the additional steps described in FIG. 9 in an illustrative embodiment.

FIG. 9 illustrates additional steps of method 400 in an illustrative embodiment. In particular, steps 902-906 are directed to fabricating dipole antennas 204-206, which is illustrated in FIG. 6. Step 908 of FIG. 9 describes forming electrical connections between a metal film on second surface 506 of substrate 502 and dipole antennas 204-206. Step 910 describes forming electrical connections to dipole antennas 204-206 (e.g., fabricating RF feedlines 802-804, previously described). FIG. 10 illustrates the result of performing steps 902-910 in an illustrative embodiment. Substrate 502 includes a metal film 1002 on second surface 506. For instance, if substrate 502 is a PCB, then metal film 1002 may comprise one of the metal surface layers of the PCB that are etched during fabrication process for unit cell 202. FIG. 10 illustrates electrical connections 1004-1006 between dipole antennas 204-206 and metal film 1002. In particular, electrical connection 1004 electrically couples antenna element 204-1 of dipole antenna 204 to metal film 1002, electrical connection 1005 electrically couples antenna element 205-1 to metal film 1002, and electrical connection 1006 electrically couples antenna element 206-1 to metal film 1002. Metal film 1002 may comprise a ground plane for dipole antennas 204-206 in some embodiments, while RF feedlines 802-804 are electrically isolated from metal film 1002. RF feedlines 802-804 may be electrically isolated from metal film 1002 using reliefs 1008-1010 on metal film 1002, respectively. Reliefs 1008-1010 may be formed by etching portions of metal film 1002 around locations on second surface 506 where RF feedlines 802-804 extend to second surface 506.

Figure 11:
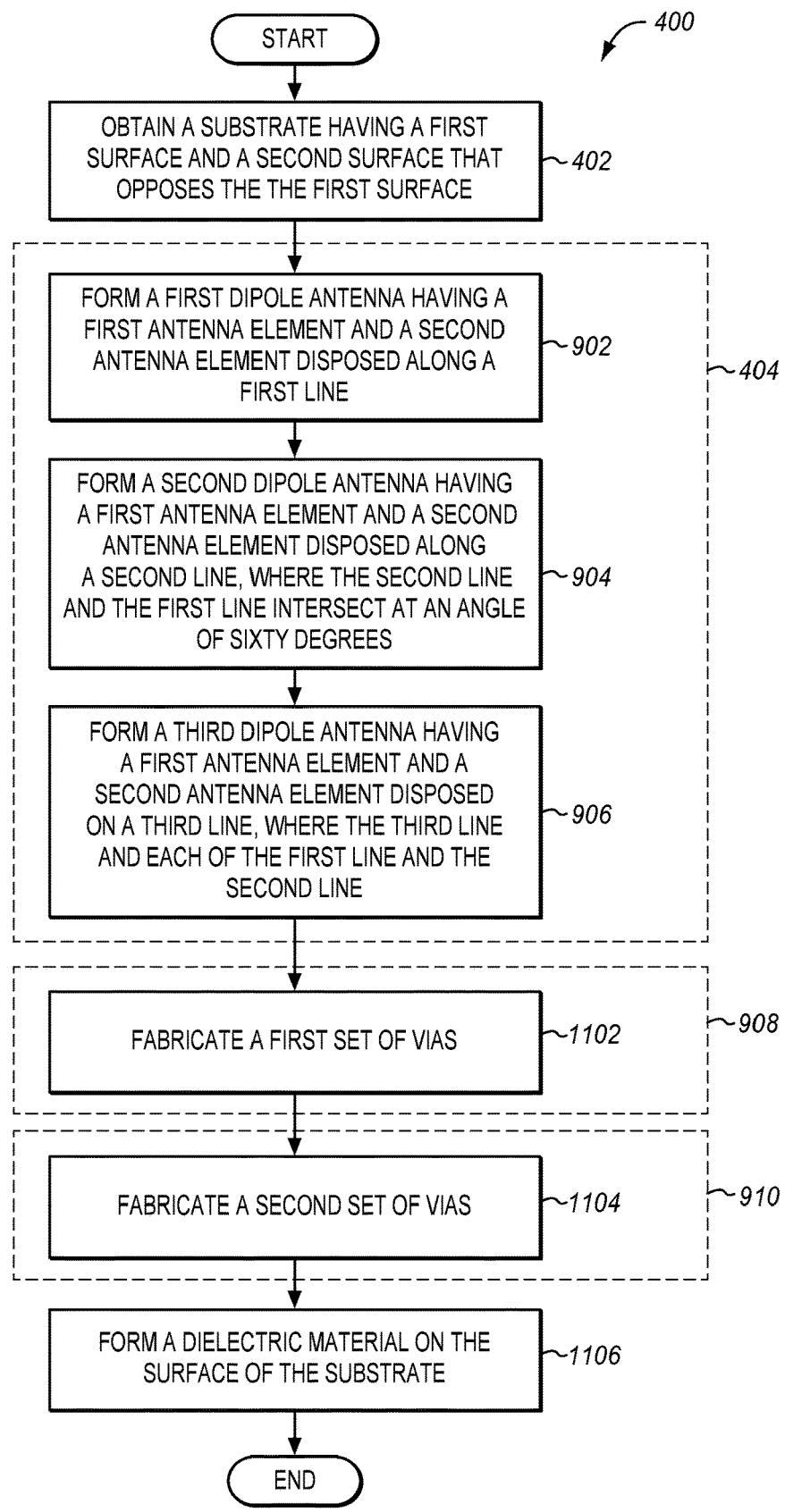
FIG. 11 illustrates additional steps of the method of FIG. 4 in an illustrative embodiment.

FIG. 11 illustrates additional steps of method 400 in an illustrative embodiment. In particular, when substrate 502 comprises a PCB, then electrical connections 1004-1006 may be formed using vias (see step 1102 of FIG. 11), and RF feedlines 802-804 may also be formed using vias (see step 1104 of FIG. 11). Vias may be fabricated based on a drill and plating process, which includes mechanical or laser drilling through substrate 502, and plating the holes formed in substrate 502.

Figure 12:
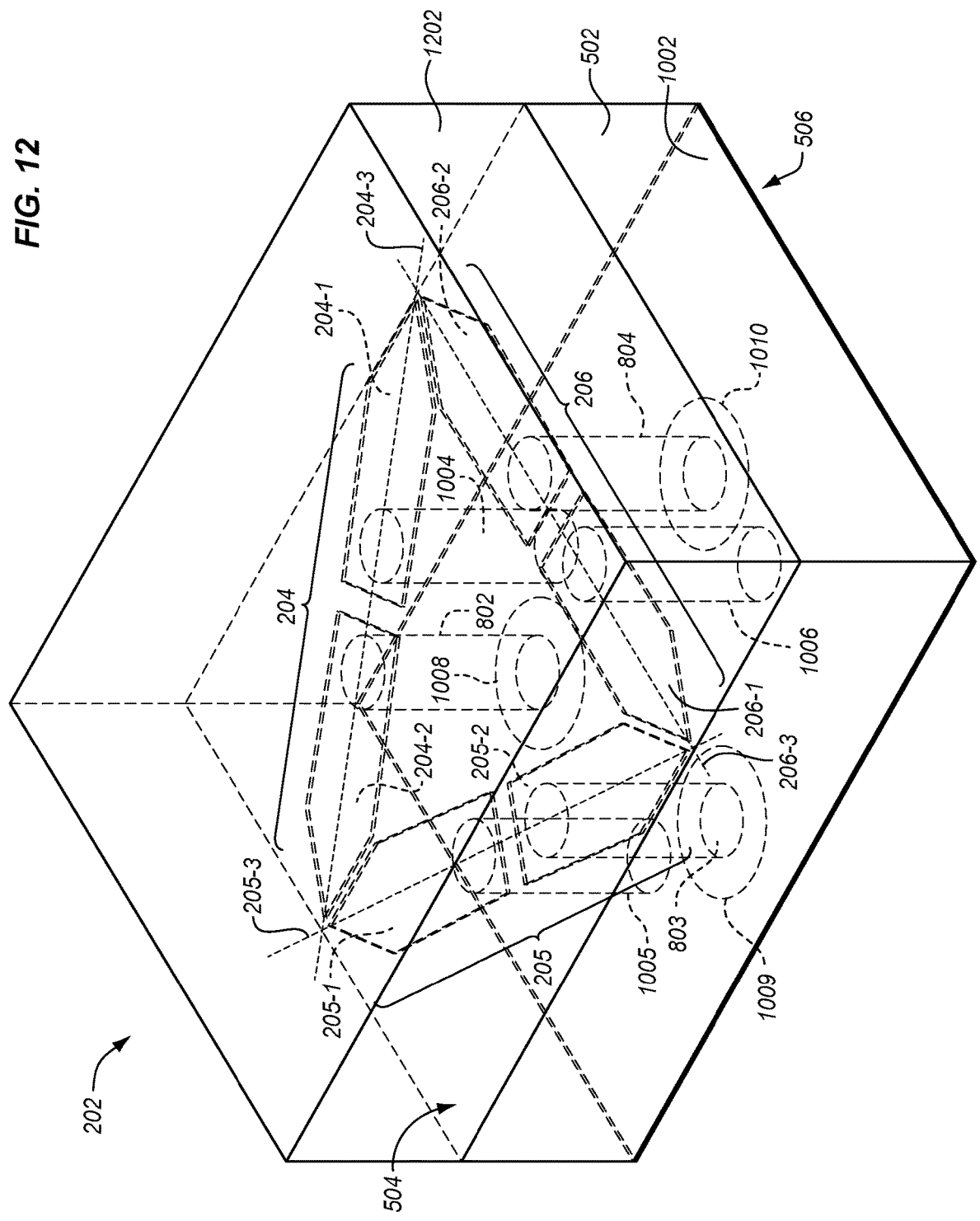
FIG. 12 illustrates the result of performing the additional steps described in FIG. 11 in an illustrative embodiment.

In some embodiments, a dielectric material may be formed on first surface 504 of substrate 502 (see step 1106 of FIG. 11). FIG. 12 illustrates a dielectric material 1202 applied to first surface 504 of substrate 502 in an illustrative embodiment. Dielectric material 1202 may be used to provide physical protection to dipole antennas 204-206 and improve array scan performance. The dielectric constant and thickness of dielectric material 1202 may be determined using constrained optimization.

To create a circular polarization for unit cell 202 illustrated in FIG. 12, a phase difference between RF feedlines 802-804 is generated. For example, a relative phase offset between RF feedlines 802-804 may be one hundred and twenty degrees with respect to each other if dipole antennas 204-206 form an equilateral triangle. Either a clockwise or a counter-clockwise phase delay may be generated as desired. For example, a clockwise phase delay results in a Left-Hand Circular Polarization (LHCP), while a counter-clockwise phase delay results in a Right-Hand Circular Polarization (RHCP). If dipole antennas 204-206 form an equilateral triangle, then a LHCP may be formed, for example, when RF feedline 804 has a phase offset of zero degrees, RF feedline 803 has a phase offset of one hundred and twenty degrees, and RF feedline 802 has a phase offset of two hundred and forty degrees. A RHCP may be formed, for example, when RF feedline 804 has a phase offset of zero degrees, RF feedline 802 has a phase offset of one hundred and twenty degrees, and RF feedline 803 has a phase offset of two hundred and forty degrees. For a non-equilateral triangular lattice, a perturbation from the one hundred and twenty degree phase delay increment is used to generate the optimum LHCP or RHCP.

As discussed previously, unit cell 202 may be fabricated onto a PCB and assembled into an array of unit cells 202 that form phased array antenna 102. The array of individual PCB tiles allows for the implementation of a wide variety of antenna apertures using unit cell. As discussed with respect to FIG. 3, the proximity of the dipole antennas from one PCB tile to a neighboring PCB tile results in TCDA triangular lattice.

Utilizing unit cell 202, phased array antenna 102 can be scaled to nearly any desired size using an array of unit cells 202 and can also be configured to have a particular shape or RF aperture using the triangular lattice formed from the configuration of dipole antennas 204-206 on unit cell 202. A PCB embodiment for unit cell 202 leverages existing PCB manufacturing processes and common PCB substrates, thereby allowing phased array antenna 102 to be fabricated from individual building blocks of unit cell 202.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. A phased array antenna, comprising:
   at least one Printed Circuit Board (PCB) unit cell, comprising:
   a dielectric substrate having a first surface and a second surface opposing the first surface;
   a first metal film on the first surface;
   a second metal film on the second surface forming a ground plane; and
   a plurality of dipole antennas formed by the first metal film and arranged on the first surface to collectively form a triangle, wherein the plurality of dipole antennas comprises:
   a first dipole antenna having a first antenna element and second antenna element disposed along a first line;
   a second dipole antenna having a first antenna element and a second antenna element disposed along a second line, wherein the second line and the first line intersect; and
   a third dipole antenna having a first antenna element and a second antenna element disposed along a third line, wherein the third line and each of the first line and the second line intersect;
   a first set of vias underneath the first antenna element of each of the first dipole antenna, the second dipole antenna, and the third dipole antenna that electrically connects the first antenna element to the second metal film; and
   a second set of vias underneath and electrically connected to the second antenna element of each of the first dipole antenna, the second dipole antenna, and the third dipole antenna, wherein the second set of vias are electrically isolated from the second metal film, wherein the second set of vias comprise Radio Frequency (RF) feedlines for the first dipole antenna, the second dipole antenna, and the third dipole antenna.

2. The phased array antenna of claim 1, wherein:
   the second line and the first line intersect at an angle of sixty degrees, and
   the third line and each of the first line and the second line intersect at an angle of sixty degrees.

3. The phased array antenna of claim 1, further comprising:
   a plurality of the at least one PCB unit cell arranged in an array to form a Tightly Coupled Dipole Array (TCDA) having a triangular lattice.

4. The phased array antenna of claim 1, wherein:
   the at least one PCB unit cell comprises a plurality of PCB unit cells arranged in a common plane.

5. The phased array antenna of claim 1, wherein:
   the dielectric substrate is rigid.

6. The phased array antenna of claim 1, wherein:
each of the first antenna element and the second antenna element of the first dipole antenna, the second dipole antenna, and the third dipole antenna includes a first portion proximate to a perimeter of the dielectric substrate that is tapered.

7. The phased array antenna of claim 6, wherein:
each of the first antenna element and the second antenna element of the first dipole antenna, the second dipole antenna, and the third dipole antenna includes a second portion distal to the perimeter of the dielectric substrate that includes edges opposing each other that are parallel with each other.

8. The phased array antenna of claim 1, wherein:
the PCB unit cell is configured to operate in a frequency range of 26.5 Gigahertz (GHz) to 40 GHz.

9. A method of fabricating a Printed Circuit Board (PCB) unit cell for a phased array antenna, the method comprising:
obtaining a dielectric substrate having a first surface and a second surface that opposes the first surface, wherein the first surface includes a first metal film and the second surface includes a second metal film forming a ground plane; and
forming, from the first metal film, a plurality of dipole antennas that are arranged to collectively form a triangle by:
  forming a first dipole antenna having a first antenna element and second antenna element disposed along a first line;
  forming a second dipole antenna having a first antenna element and a second antenna element disposed along a second line; and
  forming a third dipole antenna having a first antenna element and a second antenna element disposed along a third line;
forming a first set of vias underneath the first antenna element of each of the first dipole antenna, the second dipole antenna, and the third dipole antenna that electrically connects the first antenna element to the second metal film; and
forming a second set of vias underneath and electrically connected to the second antenna element of each of the first dipole antenna, the second dipole antenna, and the third dipole antenna, wherein the second set of vias are electrically isolated from the second metal film, wherein the second set of vias comprise Radio Frequency (RF) feedlines for the first dipole antenna, the second dipole antenna, and the third dipole antenna.

10. The method of claim 9, wherein:
the second line and the first line intersect at an angle of sixty degrees, and
the third line and each of the first line and the second line intersect at an angle of sixty degrees.

11. The method claim 9, wherein:
each of the first antenna element and the second antenna element of the first dipole antenna, the second dipole antenna, and the third dipole antenna includes a first portion proximate to a perimeter of the dielectric substrate that is tapered.

12. The method of claim 11, wherein:
each of the first antenna element and the second antenna element of the first dipole antenna, the second dipole antenna, and the third dipole antenna includes a second portion distal to the perimeter of the dielectric substrate that includes edges opposing each other that are parallel with each other.

13. A phased array antenna, comprising:
a plurality of Printed Circuit Board (PCB) unit cells arranged in a common plane to form a Tightly Coupled Dipole Array (TCDA) having a triangular lattice, each of the plurality of PCB unit cells comprising:
  a dielectric substrate having a first surface and a second surface opposing the first surface;
  a first metal film on the first surface;
  a second metal film on the second surface forming a ground plane;
  a plurality of dipole antennas formed by the first metal film and arranged on the first surface to collectively form a triangle, wherein the plurality of dipole antennas comprises:
    a first dipole antenna having a first antenna element and second antenna element disposed along a first line;
    a second dipole antenna having a first antenna element and a second antenna element disposed along a second line, wherein the second line and the first line intersect; and
    a third dipole antenna having a first antenna element and a second antenna element disposed along a third line, wherein the third line and each of the first line and the second line intersect;
  a first set of vias underneath the first antenna element of each of the first dipole antenna, the second dipole antenna, and the third dipole antenna that electrically connects the first antenna element to the second metal film; and
  a second set of vias underneath and electrically connected to the second antenna element of each of the first dipole antenna, the second dipole antenna, and the third dipole antenna, wherein the second set of vias are electrically isolated from the second metal film, wherein the second set of vias comprise Radio Frequency (RF) feedlines for the first dipole antenna, the second dipole antenna, and the third dipole antenna.

14. The phased array antenna of claim 13, wherein:
the second line and the first line intersect at an angle of sixty degrees, and
the third line and each of the first line and the second line intersect at an angle of sixty degrees.

15. The phased array antenna of claim 13, wherein:
each of the first antenna element and the second antenna element of the first dipole antenna, the second dipole antenna, and the third dipole antenna includes a first portion proximate to a perimeter of the dielectric substrate that is tapered.

16. The phased array antenna of claim 15, wherein:
each of the first antenna element and the second antenna element of the first dipole antenna, the second dipole antenna, and the third dipole antenna includes a second portion distal to the perimeter of the dielectric substrate that includes edges opposing each other that are parallel with each other.

17. The phased array antenna of claim 13, wherein:
the PCB unit cell is configured to operate in a frequency range of 26.5 Gigahertz (GHz) to 40 GHz.

* * * * *